US012290227B2

(12) United States Patent
White-Petteruti

(10) Patent No.: US 12,290,227 B2
(45) Date of Patent: May 6, 2025

(54) DRYER BOX FOR A KITCHEN DRAWER

(71) Applicant: Nicholas White-Petteruti, Chicago, IL (US)

(72) Inventor: Nicholas White-Petteruti, Chicago, IL (US)

(73) Assignee: Nicholas White-Petteruti, Chicago, IL (US)

( * ) Notice: Subject to any disclaimer, the term of this patent is extended or adjusted under 35 U.S.C. 154(b) by 717 days.

(21) Appl. No.: 17/550,543

(22) Filed: Dec. 14, 2021

(65) Prior Publication Data

US 2022/0192463 A1 Jun. 23, 2022

Related U.S. Application Data

(60) Provisional application No. 63/127,574, filed on Dec. 18, 2020.

(51) Int. Cl.
*A47L 19/00* (2006.01)

(52) U.S. Cl.
CPC .................... *A47L 19/00* (2013.01)

(58) Field of Classification Search
CPC ................. A47L 19/00; A47J 47/00
See application file for complete search history.

(56) References Cited

U.S. PATENT DOCUMENTS

| 2,328,129 | A | | 1/1940 | Earle |
| 2,661,750 | A | | 12/1953 | McNairy |
| 3,571,939 | A | | 3/1971 | Paul |
| 4,442,478 | A | * | 4/1984 | Stansbury ............... F21V 23/04 362/201 |
| 4,812,621 | A | | 3/1989 | Brotherton et al. |
| 5,555,640 | A | | 9/1996 | Ou |
| 8,413,471 | B2 | * | 4/2013 | Han ...................... D06F 29/005 68/20 |
| 2007/0221259 | A1 | | 9/2007 | Drago et al. |
| 2007/0274856 | A1 | | 11/2007 | Kwon |
| 2015/0184937 | A1 | * | 7/2015 | Hywel .................... F26B 9/066 34/232 |

FOREIGN PATENT DOCUMENTS

| CN | 108498816 A | * | 9/2018 |
| JP | 3954425 B2 | * | 8/2007 |

OTHER PUBLICATIONS

Translation, JP-3954425-B2 (Year: 2007).*
Translation, CN-108498816-A (Year: 2018).*
Coral UV, UV Sterilizer and Dryer, webpage, 2018.
Wabi, Touch Control Dual Function UV Sterilizer & Dryer, webpage, 2020.

* cited by examiner

*Primary Examiner* — Jessica Yuen
(74) *Attorney, Agent, or Firm* — McDonnell Boehnen Hulbert & Berghoff

(57) ABSTRACT

The present disclosure relates to a drying apparatus, and more particularly relates to a dryer box for a kitchen drawer. The dryer box includes a housing having a front, a back, a top and a bottom. The housing includes a basin defining an interior space configured to hold items for drying, and a lid configured to close the basin at the top of the housing. An inlet vent is disposed along the front of the housing and an outlet vent disposed along the front of the housing. A ventilation fan is in fluid communication with the inlet vent and the outlet vent. The ventilation fan being is configured to circulate air through the interior space of the housing from the inlet vent to the outlet vent.

18 Claims, 8 Drawing Sheets

DRYER BOX FOR A KITCHEN DRAWER

CROSS REFERENCE TO RELATED APPLICATIONS

The present application claims priority to U.S. Provisional Application No. 63/127,574, filed Dec. 18, 2020, the disclosure of which is hereby incorporated by reference in its entirety.

FIELD

The present disclosure relates to a drying apparatus, and more particularly relates to a dryer box for a kitchen drawer.

BACKGROUND

It is common for many items to be washed in the kitchen every day. In many households, cookware, dishes, glasses and silverware are washed at every meal that is consumed at home. While many items are now washed in dishwashers, not all items are dishwasher safe and dishwashers are not available in all kitchens. Moreover, food is also frequently washed in kitchens before being stored.

After being washed, items are typically wet and covered with droplets of water. Immediately storing these wet items in cabinets can lead to mold growth and odors. Likewise, the added moisture can make the insides of cabinets damp and unsuitable for safe storage of items. One solution to this problem is to hand dry items before they are stored, for example using dish towels. This solution is effective, but it is time consuming and inefficient.

Another option is to place the dishes on a countertop where they can "air dry" over time. Large water droplets are allowed to drip from the items and residual moisture eventually evaporates. Allowing the items to air dry circumvents the need to hand dry the items, but it covers a substantial amount of counter space with the items being dried. Accordingly, as the items are drying and before they are stored, they occupy otherwise usable countertop space and create clutter in the kitchen. Therefore, the present inventor has recognized that an alternative solution for drying items in a kitchen is needed.

SUMMARY

In a first aspect, the present disclosure provides a dryer box for a kitchen drawer, the dryer box comprising:
a housing having a front, a back, a top and a bottom, the housing including:
  a basin defining an interior space configured to hold items for drying, and
  a lid configured to close the basin at the top of the housing;
an inlet vent disposed along the front of the housing;
an outlet vent disposed along the front of the housing; and
a ventilation fan in fluid communication with the inlet vent and the outlet vent, the ventilation fan being configured to circulate air through the interior space of the housing from the inlet vent to the outlet vent.

In a second aspect, the present disclosure provides a drying system for drying articles inside a kitchen drawer, the system comprising:
a cabinet frame including an opening;
a kitchen drawer disposed in the opening of the cabinet frame and movable between an extended position and closed retracted position; and
a dryer box disposed in the kitchen drawer, the dryer box comprising:
  a housing having a front, a back, a top and a bottom, the housing including:
    a basin defining an interior space configured to hold items for drying, and
    a lid configured to close the basin at the top of the housing;
  an inlet vent disposed along the front of the housing;
  an outlet vent disposed along the front of the housing; and
  a ventilation fan in fluid communication with the inlet vent and the outlet vent, the ventilation fan being configured to circulate air through the interior space of the housing from the inlet vent to the outlet vent.

In a third aspect, the present disclosure provides a method of operating a dryer box for drying articles in a kitchen drawer, the method comprising:
providing the dryer box in the kitchen drawer, the dryer box comprising:
a housing having a front, a back, a top and a bottom, the housing including:
a basin defining an interior space configured to hold items for drying, and
a lid configured to close the basin at the top of the housing,
an inlet vent disposed along the front of the housing,
an outlet vent disposed along the front of the housing;
a ventilation fan in fluid communication with the inlet vent and the outlet vent, the ventilation fan being configured to circulate air through the interior space of the housing from the inlet vent to the outlet vent; and
an actuator that is movable between a first position in which the actuator holds the kitchen drawer in an open position and a second position
operating the ventilation fan so as to remove moisture from the interior space of the housing of the dryer box; and
moving the actuator from the first position to the second position so as to move the kitchen drawer from the open position to the closed position.

These and other aspects of the disclosure will be evident to those of ordinary skill in the art from the following detailed description.

BRIEF DESCRIPTION OF THE DRAWINGS

Certain example embodiments are shown in the following-identified figures and described in detail below. In describing these examples, like or identical reference numbers are used to identify the same or similar elements. The figures are not necessarily to scale and certain features and certain views of the figures may be exaggerated in scale or depicted in schematic form for clarity or conciseness.

DETAILED DESCRIPTION

Unless otherwise indicated herein, the terms "first," "second," etc. are used merely as labels. These identifiers are not intended to impose hierarchical, ordinal, or positional requirements on the items to which these terms refer. Moreover, reference to a "first" feature or item does not require the existence of a "second" or higher-numbered item.

Unless otherwise indicated herein, the term "or" is inclusive. For example, a description of a device as including a first component or a second component should be understood to include devices including the first component without the second component, devices including the second component without the first component, and devices including both the first component and the second component.

As used herein, the description of a system, apparatus, device, structure, article, element, component, or hardware as being "configured to" perform a specified function is indeed capable of performing the specified function without any alteration, rather than merely having potential to perform the specified function after further modification. In other words, the system, apparatus, structure, article, element, component, or hardware "configured to" perform the specified function is specifically selected, created, implemented, utilized, programmed, and/or designed for the purpose of performing the specified function. Further, as used herein, the term "configured to" denotes existing characteristics of the system, apparatus, structure, article, element, component, or hardware which enable the system, apparatus, structure, article, element, component, or hardware to perform the specified function without further modification.

As described above, the present inventor has identified the problem of wet items that are left on a countertop in a kitchen, limiting usable space and adding clutter to the kitchen.

Accordingly, a first aspect of the disclosure is a dryer box for a kitchen drawer. The dryer box includes a housing having a front, a back, a top and a bottom. The housing of the dryer box includes a basin defining an interior space configured to hold items for drying, and a lid configured to close the basin at the top of the housing. The dryer box also includes an inlet vent disposed along the front of the housing and an outlet vent disposed also along the front of the housing. A ventilation fan is in fluid communication with the inlet vent and the outlet vent, the ventilation fan being configured to circulate air through the interior space of the housing from the inlet vent to the outlet vent.

Figure 1:
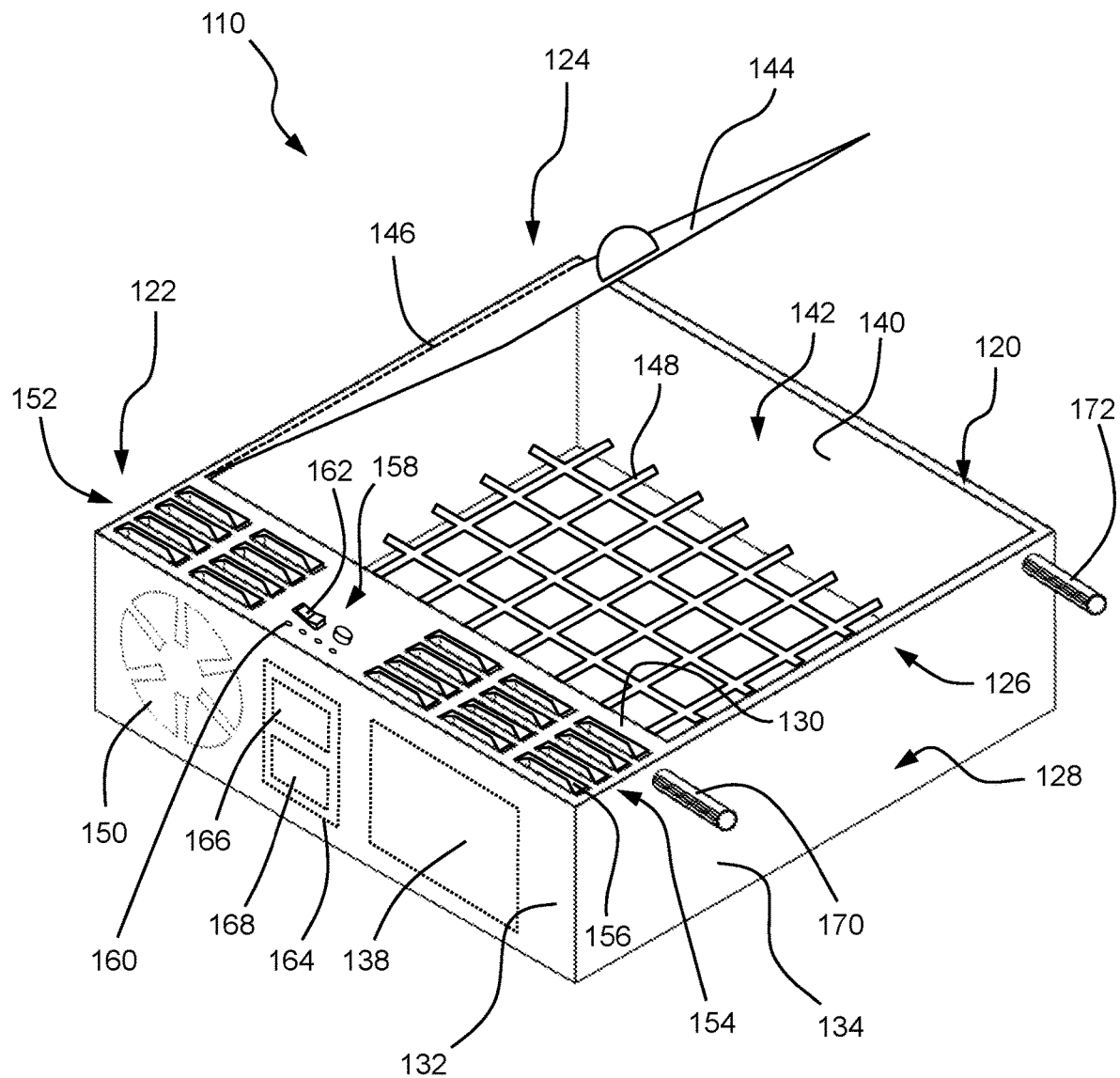
FIG. 1 is a schematic perspective view of a dryer box according to an embodiment of the disclosure with the lid open.

Such an embodiment of a dryer box is shown in FIG. 1. The illustrated dryer box 110 includes a housing 120 that has a front 122, a back 124, a top 126 and a bottom 128. The housing 120 includes a basin 140 that defines an interior space 142 for receiving items that are to be dried. The dryer box 110 also includes an inlet vent 152 and an outlet vent 154 that are both disposed along the front 122 of the housing 120. In the embodiment shown in FIG. 1, the inlet vent 152 and outlet vent 154 are disposed in the upper surface 130 of the housing 120. In other embodiments, the inlet and outlet vents may be positioned in the front surface of the housing, as described in more detail below, or in a side surface of the housing. Further still, in some embodiments, both the inlet vent and the outlet vent are positioned at the front of the housing, but one of the vents is disposed in the upper surface of the housing and the other of the vents is positioned in the front surface of the housing. Other configurations are also possible.

The housing 120 may also include a lid 144 that closes the interior space 142 of the basin 140 at the top 126 of the housing 120. In the illustrated embodiment, the lid 144 is formed entirely within the upper surface 130 of the housing 120. In other embodiments, the lid may extend downward from the top surface along the lateral sides of the housing, for example, covering a portion of the walls of the basin. Further, in the illustrated embodiment, the lid 144 is set back from the front surface 132 of the housing 120 to provide space for the inlet vent 152 and the outlet vent 154. In other embodiments, the lid may extend up to the front surface of the housing.

Figure 2:
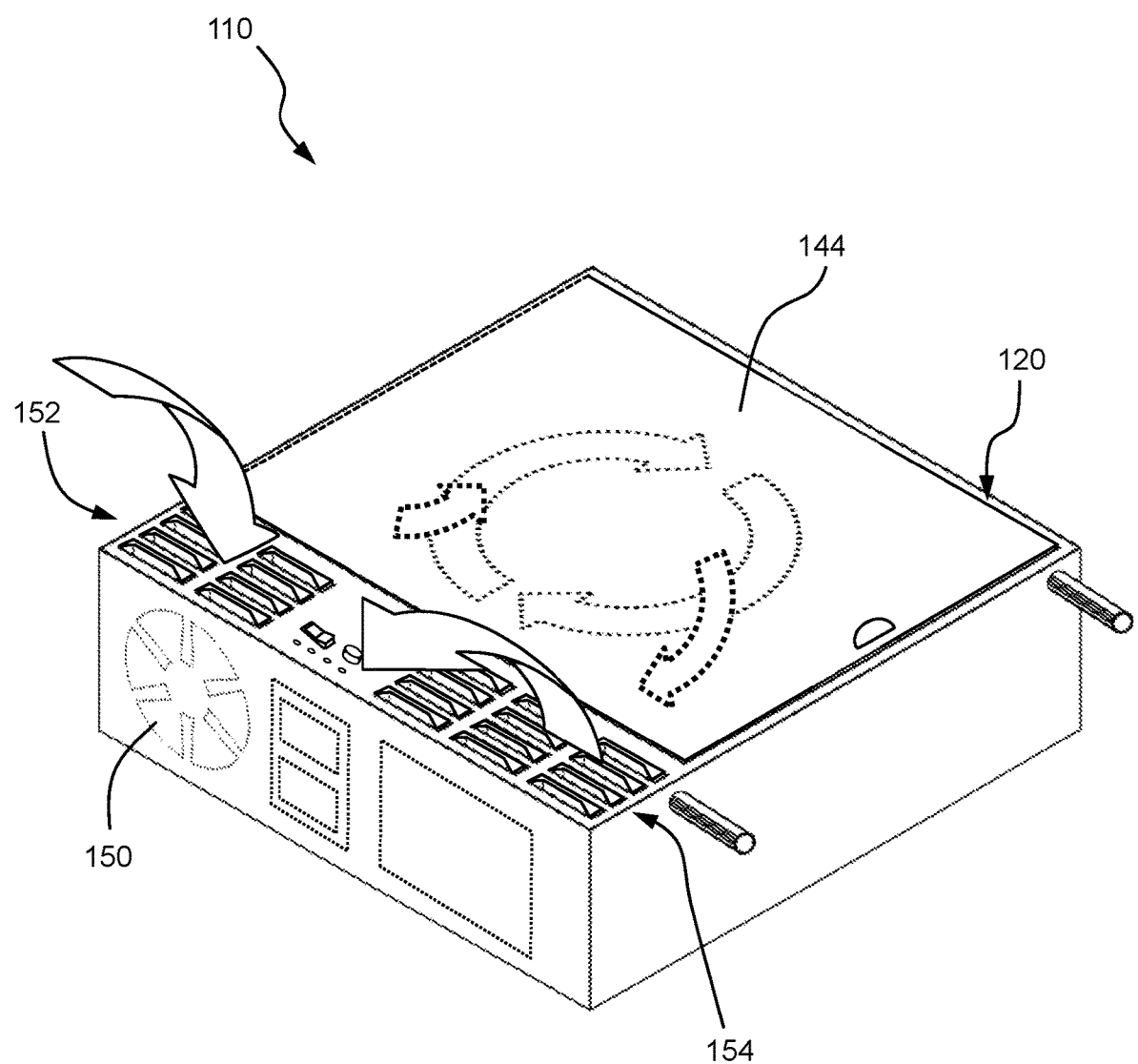
FIG. 2 is a schematic perspective view of the dryer box of FIG. 1 with the lid closed.

The dryer box 110 may also include a ventilation fan 150 positioned within the housing 120 that is in fluid communication with the inlet vent 152, the interior space 142 of the basin 140, and the outlet vent 154. Accordingly, as shown in FIG. 2, when the ventilation fan 150 is running, it draws air into housing the 120 through the inlet vent 152, circulates the air through the interior space 142, and exhausts the air through the outlet vent 154. In the depicted embodiment of the dryer box 110, the ventilation fan 150 is upstream of the interior space 142 near the inlet vent 152. In other embodiments, the ventilation fan may be downstream of the interior space and near the outlet vent. Further, in some embodiments, the dryer box may include fans both upstream and downstream of the interior space. Further still, in some embodiments, the interior space may include different cavities, and the ventilation fan may be positioned between the cavities, and not immediately adjacent to either the inlet vent or the outlet vent.

By circulating air through the interior space of the dryer box, the ventilation fan helps promote drying of articles that are stored in the basin. The air exhausted from the dryer box through the outlet vent will carry moisture out of the basin allowing droplets to evaporate from the surfaces of the articles. Accordingly, the dryer box can be used to dry articles that are hidden from view, rather than being left on a countertop.

In some embodiments, the dryer box may include a user input disposed at the front of the housing. For example, the dryer box 110 includes a control panel 158 that has several indicator lights 160 and includes various inputs including a first user input 162. In embodiments of the disclosure the user input can take various forms, including a switch, a button, a touch screen or another input for controlling operation of the components of the dryer box including the ventilation fan. In some embodiments, the user input may directly control power to the ventilation fan, for example in the form of a switch. In such an embodiment, the user operates the ventilation fan directly, and will choose when to start and stop the ventilation fan according to their needs. In other embodiments, the user input may be controlled by a timer. For example, after a user turns the ventilation fan on using the user input, the ventilation fan may run until the timer expires and then be shut off. Such a timer may be digital or mechanical. Further, the timer can have a single duration, or can have a selectable duration that may also be mechanical or digital.

Moreover, in some embodiments, the user input may be coupled to a controller, as explained in more detail below. In such embodiments, the controller may receive input signals from the user input and operate the components of the dryer box based on the received input signals.

In some embodiments, the user input is positioned between the inlet vent and the outlet vent. For example, in the dryer box 110 shown in FIGS. 1 and 2, the control panel 158, including the first user input 162 is positioned at the front 122 of the housing 120 on the upper surface 130 between the inlet vent 152 and the outlet vent 154. The position of the control panel 158 between the inlet vent 152 and the outlet vent 154 provides convenient access to the first user input 162 when the dryer box 110 is positioned inside of a kitchen drawer. The control panel 158 can be easily accessed without removing the dryer box 110 from the drawer or even fully opening the drawer. The position of the inlet vent 152 and the outlet vent 154 at the front of the housing 120 is convenient for similar reasons. This position allows the dryer box to receive and exhaust air from outside the kitchen cabinet without requiring the drawer to be fully extended. Thus, providing the control panel 158 and the first user input 162 between the inlet vent 152 and the outlet vent 154 allows all three features to be conveniently placed. In contrast, this position of the control panel, inlet vent, and outlet vent would be less convenient for a dryer box that is intended for a countertop. In such a case, the location of the dryer box on top of the counter would place the vents and the control panel much closer to a user's face. Accordingly, placing the vents at the front of a dryer box that is intended for a countertop and putting the control panel, which the user must interact with, in the vicinity of the vents might be considered a nuisance.

Figure 3:
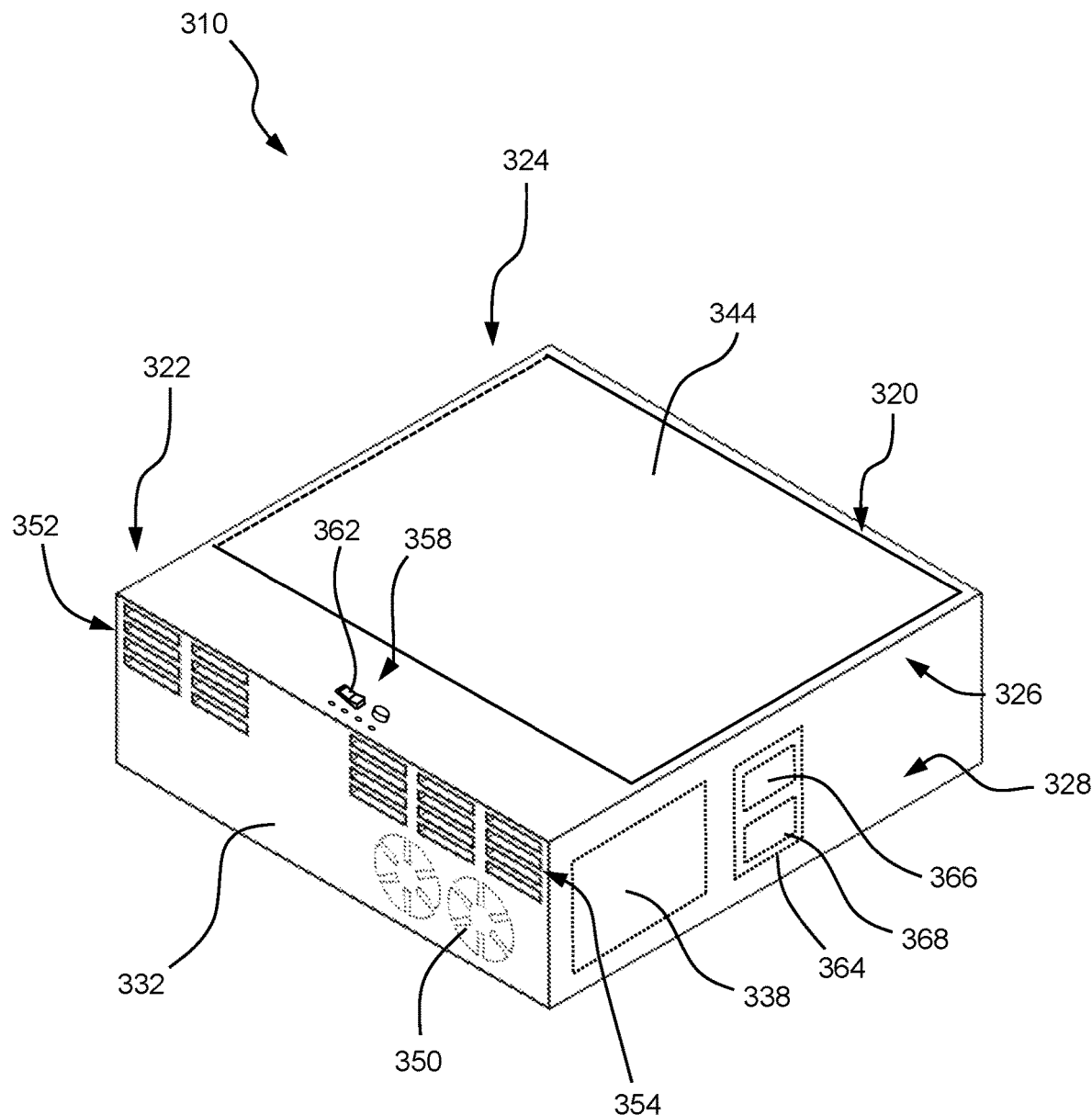
FIG. 3 is a schematic perspective view of a dryer box according to another embodiment of the disclosure.

FIG. 3 shows another embodiment of a dryer box according to the disclosure. The illustrated dryer box 310 includes a housing 320 that has a front 322, a back 324, a top 326 and a bottom 328. The housing 320 includes a basin that defines an interior space for receiving items that can be closed by a lid 344. The dryer box 310 also includes an inlet vent 352 and an outlet vent 354 that are both disposed along the front 322 of the housing 320. In the embodiment shown in FIG. 3, the inlet vent 352 and outlet vent 354 are disposed in the front surface 334 of the housing 120. The dryer box 310 also includes a ventilation fan 350 and control panel 358, configured to receive user controls using at least a first user input 362.

In some embodiments, the dryer box includes an actuator that is movable between a first position in which the actuator is configured to hold the kitchen drawer open and a second position in which the kitchen drawer is closed. The term open, as used herein, refers to any position of the drawer between a closed position and a fully extended position. Thus, the drawer is considered to be open if it is pulled out to any distance past a closed position such that any item inside the drawer, including the dryer box of the disclosure, can be physically accessed. In some embodiments the actuator may be configured to move the drawer between the open position and the closed position. For example, in some embodiments the actuator includes a motor or linear actuator that is configured to slide the drawer open and closed. On the other hand, in some embodiments the actuator may be configured to cooperate with the drawer and/or the frame of the cabinet to hold the drawer open when the actuator is in the first position and to allow the drawer to close when the actuator moves to the second position.

Figure 4:
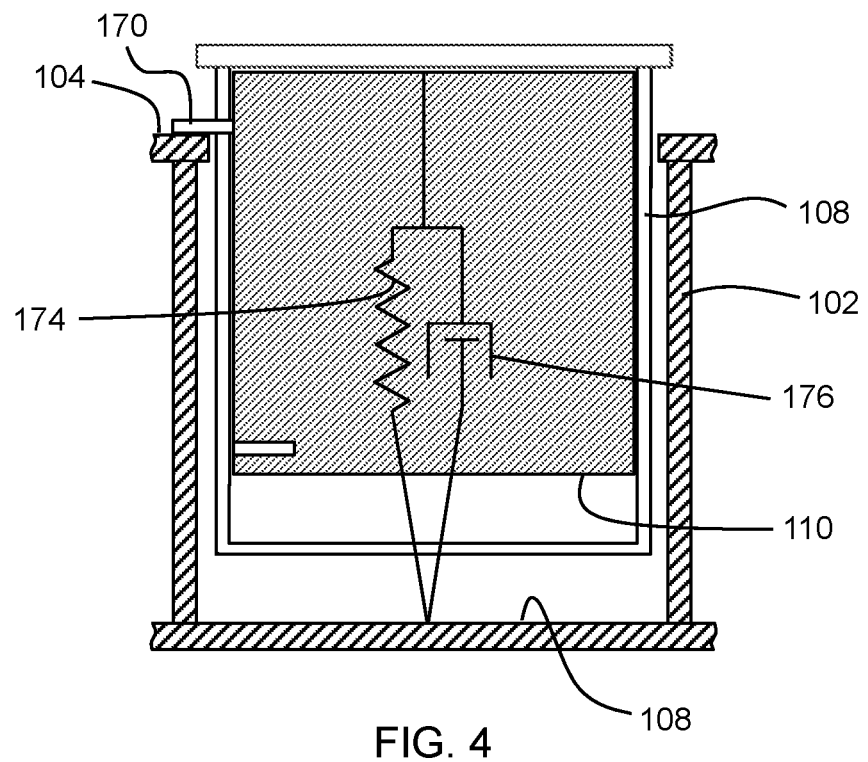
FIG. 4 is a schematic top view of the dryer box of FIG. 1 in a drawer located in a first position.
Figure 5:
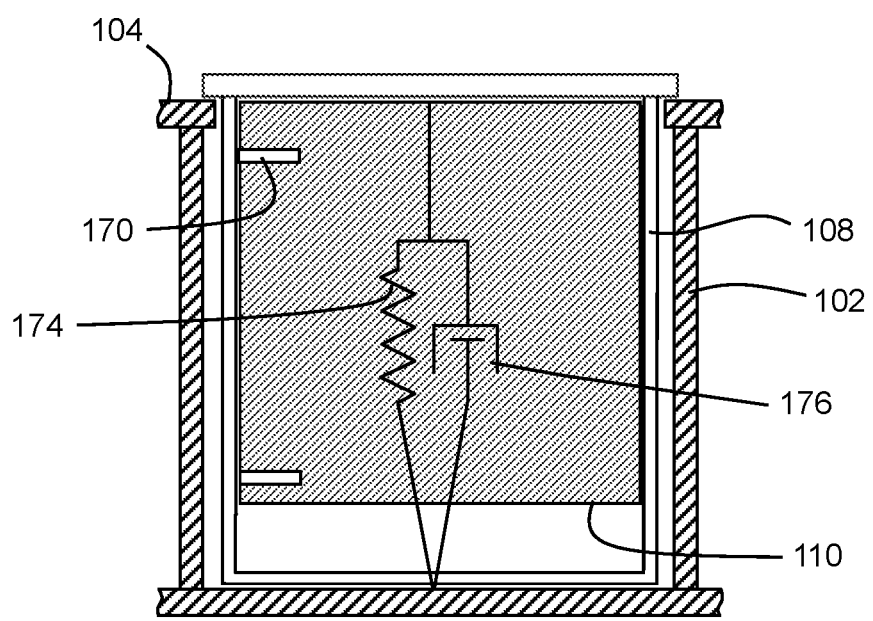
FIG. 5 is a schematic top view of the dryer box of FIG. 1 in a drawer located in a second position.

For example, in some embodiments, when the actuator is in the first position, the actuator extends laterally from a side of the housing and is configured to engage a cabinet frame that contains the kitchen drawer so as to hold the kitchen drawer in the open position. For example, the dryer box 110 shown in FIGS. 1 and 2 includes a first actuator 170 that extends outward from the lateral side surface 134 of the housing 120. Operation of the first actuator 170 is shown in FIGS. 4 and 5. The dryer box 110 is shown in FIGS. 4 and 5 inside a drawer 108 of a cabinet 102. As explained in more detail below, the drawer in the depicted system may be continuously urged toward a closed position. FIG. 4 shows the first actuator 170 in a first position where it is holding the drawer open, which provides access between the drawer 108 and the surrounding environment. Accordingly, when the ventilation fan 150 is run, air can be drawn into the dryer box 110 from outside of the cabinet 102 and then also exhausted to the surrounding environment. Specifically, the first actuator 170 may act as an arm that extends laterally outward from the side of the housing 120 of the dryer box 110. When the drawer is open and the first actuator 170 is in the first position it may engage the front face 104 of the cabinet 102 to prevent the cabinet drawer 108 from closing.

When operation of the ventilation fan 150 is completed, the first actuator 170 may be moved to the second position, where it is retracted into the housing 120. This allows the first actuator 170 to disengage from the front face 104 of the cabinet 102 so that the drawer 108 may move to a closed position, as shown in FIG. 5.

Figure 6:
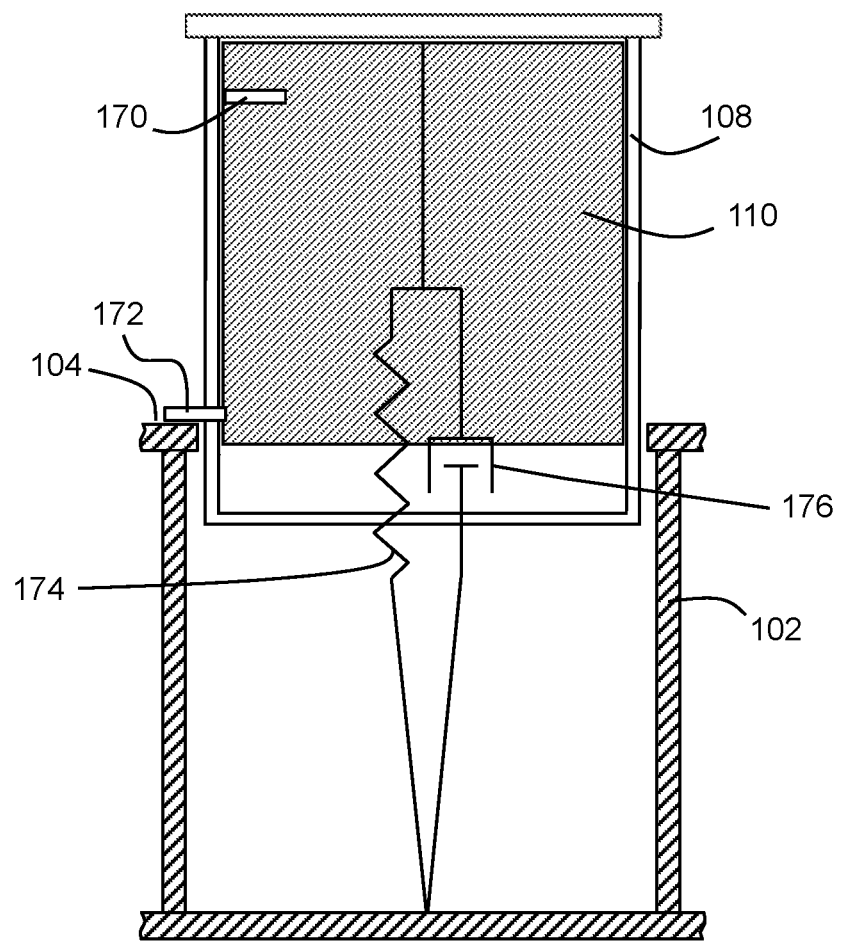
FIG. 6 is a schematic top view of the dryer box of FIG. 1 in a drawer located in a third position.

In some embodiments, the dryer box may include a second actuator that extends from the lateral side face of the housing to hold the drawer in a further extended position. For example, the dryer box 110 shown in FIGS. 1 and 2 includes a second actuator 172 that extends from the lateral side surface 134 of the housing 120 when it is in a first position. As shown in FIG. 6, the second actuator 172 may be used to hold the drawer 108 in a more fully extended position, for example, when the lid 144 is removed from the basin 140 and the interior space 142 is being loaded (see FIG. 1). This allows the drawer 108 to remain open during the loading process without the need for a person to continuously hold the drawer open. In the depicted embodiment, the second actuator 172 is disposed on the same side of the housing 120 as the first actuator 170. In other embodiments, the first and second actuators may be disposed on opposite sides of the housing. As an alternative to the second actuator, in some embodiments the dryer box may incorporate a manually positioned arm that holds the drawer open until loading of the dryer box is completed. After loading the dryer box, the user can then move the manually positioned arm to a second position to allow the drawer to partially close.

In some embodiments, the dryer box may also include a spring configured to attach to the cabinet frame and urge the kitchen drawer to a closed position, and the actuator is configured to counter the force of the spring when arranged in the first position. For example, as shown in FIGS. 4-6, a spring 174 may be connected to the dryer box 110 and to the rear 106 of the cabinet frame 102. As a result, when the drawer 108 of the cabinet is pulled out, the spring 174 may urge the drawer 108 to return to a closed position. In order to hold the drawer 108 open during operation of the ventilation fan 150 of the dryer box 110, the first actuator 170 may be disposed in the first position, as explained above. In some embodiments, the spring 174 may be coupled with a damper 176 to facilitate a smooth return of the drawer 108 to the closed position.

In some embodiments, the spring may be formed as a mechanical spring, such as a coil spring formed of metal or another material. In other embodiments, the spring may be formed of an elastomeric material, such as an elastic band.

Still, in other embodiments, the spring may be formed as a pneumatic spring, such as an air-filled piston. Other configurations are also possible.

In some embodiments, the spring and damper may be included in a single unit, similar to a drawer slide. Further, in some embodiments, the spring unit may be built into the housing of the dryer box. This allows a user to connect the rear end of the spring and damper unit to the cabinet frame in a single step. In other embodiments, the spring unit may be initially disconnected from the dryer box so that the user can attach the unit to both the dryer box and the cabinet frame at appropriate locations for the existing configuration. In other embodiments, the spring unit may extend between the drawer and the cabinet frame without connecting to the dryer box. For example, in some embodiments, the spring unit may be provided as a drawer slide that urges the drawer to a closed position.

In some embodiments, the spring may urge the drawer toward a closed position along the entire length of the extension of the drawer, i.e., when the drawer is partially closed and when the drawer is fully extended. In other embodiments, the spring unit may be configured so that the action of the spring is only engaged over a portion of the path of the drawer. For example, in some embodiments, the spring unit may be configured similar to a "soft close" drawer slide that moves unencumbered through a portion of the path of the drawer, but engages the spring when the drawer reaches certain position. The spring then urges the drawer closed for the remainder of the path of the drawer.

In some embodiments, the dryer box may also include a controller configured to send a first control signal to the ventilation fan to operate the ventilation fan for a predetermined time period and to send a second control signal to the actuator to move the actuator to the second position so as to initiate the closing of the drawer. For example, the dryer box 110 shown in FIGS. 1 and 2 includes a controller 164 that is schematically depicted next to the ventilation fan 150. The controller may include a processor 166 and a memory 168. The processor 166 of controller 164 may include a computer processing element, e.g., a central processing unit (CPU), an integrated circuit that performs processor operations, a digital signal processor (DSP), or a network processor. In some embodiments, the processor may include register memory that temporarily stores instructions being executed and corresponding data, as well as cache memory that temporarily stores performed instructions. The memory 168 of controller 164 may be a computer-usable memory, e.g., random access memory (RAM), read-only memory (ROM), or non-volatile memory such as flash memory, solid state drives, or hard-disk drives. In certain embodiments, the memory 168 may store program instructions that are executable by the processor 166 for carrying out the methods and operations of the disclosure.

For example, in some embodiments, the memory 168 includes program instructions so that the processor 166, upon receiving a signal from the first user input 162, sends a first control signal to initiate operation of the ventilation fan 150 and to move the first actuator 170 to the first position. The program instructions may further be configured to run the ventilation fan 150 and hold the first actuator 170 in the first position for a predetermined period of time so that the drawer remains open while the ventilation fan is running. Upon the expiration of the predetermined period of time, the processor 166 may send additional control signals to end the operation of the ventilation fan 150 and to move the first actuator 170 to the second position so as to allow the drawer 108 to close (as shown in FIGS. 4 and 5).

In some embodiments, operation of the ventilation fan and movement of the first actuator may be synchronized. In other embodiments, the program instructions may have individual operating durations for each component. Further, in some embodiments, the control panel 158 may be configured to allow cancellation of a drying operation. For example, in some embodiments, a user can termination operation of the ventilation fan and movement of the first actuator to the second position by activating the first user input 162 or another user input. Further, the control panel 158 may also display the operating state of the dryer box 110, for example using an indicator light or some other indication to show that the dryer box 110 is operating or if operation has completed. Likewise, the control panel 158 may show the remaining duration of operation of the dryer box 110, either with an indicator light, a digital counter, or another indicator. Further still, the control panel may also show if the dryer box 110 has experienced an error based on a signal from the controller 164.

The dryer box 310, shown in FIG. 3, also includes a controller 364 including a processor 366 and memory 368. Similar to the embodiments described above, the controller 364 can be used to provide program instructions to components of the dryer box 310.

In some embodiments, the housing of the dryer box may be formed of metal, such as aluminum or steel. As an example, in some embodiments, the housing may be formed of bent sheet metal. In other embodiments, the housing may be formed of plastic. Combinations of plastic and metal are also possible, as is the use of other materials. For example, in some embodiments, the lid is formed of a different material than the rest of the housing. For example, in some embodiments, the lid is formed of a clear material, such as clear plastic or glass, while the rest of the housing is formed of another material, such as metal or another plastic. The use of a clear lid allows the contents of the dryer box to be viewed without opening the dryer box.

In some embodiments, the lid is attached to the basin by a hinge. For example, dryer box 110, shown in FIGS. 1 and 2, may include hinge 146 disposed along one edge of the opening of the housing 120 that holds the lid 144 to the housing 120. According, when the dryer box 110 is being loaded, the lid can be rotated about the hinge to provide access to the interior space 142 of the housing 120. In some embodiments, the lid may plug the opening of the interior space 142. In other embodiments, the lid may be configured to projected over the edge of the housing and enclose the opening of the interior space.

In some embodiments, the basin of the housing is water sealed, and the housing includes a seal disposed between the basin and the lid. For example, in some embodiments, the basin is formed of a unitary sealed structure, such as a single integral piece. In other embodiments, the housing includes seams that are closed with a seal. Further, in some embodiments, a seal, such as elastomeric seal, is provided around the opening of the housing. Such a seal may be formed on the surface of the housing or on perimeter of the lid.

In some embodiments, the basin may include a well for catching water that drips from items placed in the dryer box. Such a well may be positioned at the bottom of the basin, and arranged such that the interior surfaces of the basin divert water to the well. In some embodiments, the well may be removable, so that any water caught in the well can be discarded by removing the well. In other embodiments, the well may be coupled to a pump that is configured to remove water from the basin. For example, the pump may transfer the water to a removable container.

In some embodiments, a rack may be disposed in the interior space of the housing that is configured to hold items above a bottom surface of the basin. For example, as shown in FIG. 2, dryer box 110 may include a rack 148 disposed within the interior space 142 of housing 120 that holds items above the bottom surface of the basin 140. The rack 148 limits the amount of contact between items disposed in the dryer box 110 and the surfaces therein, which helps promote drying. Moreover, the rack 148 also elevates the items in the dryer box above any water that has dripped down from the items. In some embodiments, the rack may be formed as a wire grid or another rack configuration. Further, in some embodiments the rack may include vertical tines, that help keep items separated and organized.

In some embodiments, the rack may be configured as a removable insert that is placed in the interior space 142 of the housing 120. In other embodiments, the rack may be integrally formed with the basin of the housing. For example, in some embodiments, the bottom surface of the basin includes projections that extend upward to form a rack.

In some embodiments, the dryer box also includes a battery disposed in the housing and configured to provide power to the ventilation fan. For example, the dryer box 110 shown in FIGS. 1 and 2 includes a battery 138 disposed in the housing 120 and connected to the ventilation fan 150 and controller 164. The battery 138 can provide power to the ventilation fan 150 and controller 164 so that connecting the dryer box 110 to an electrical grid is unnecessary. In other embodiments, the dryer box may include an electrical wire configured to attach to a traditional outlet or another power source. The dryer box 310 shown in FIG. 3 also includes a battery 338 that can similarly provide power to the components of the dryer box 310.

In some embodiments, the battery may include a port for a cable to connect to a power source so that the battery can be charged. Further, in some embodiments, the battery may be removable so that the battery can be charged without requiring a power cable extending between the drawer and an outlet or power source. In some embodiments, the control panel may include an indicator to display the charge state of the battery. In other embodiments, such an indicator may be provided directly on the battery. The indicator may be in the form of a light or a visual depiction of the state of the battery.

In some embodiments, the dryer box also includes a vent diverter disposed over the outlet vent and configured to direct exhaust from the dryer box. The vent diverter may be positioned over the outlet vent and guide the exhaust air in a desired direction. In some embodiments the inlet vent may also include a vent diverter to guide air into the inlet vent. In some embodiments, the vent diverter may be formed as louvers associated with individual apertures in the vent. For example, each of the inlet vent 152 and outlet vent 154 of the dryer box 110 shown in FIGS. 1 and 2, includes vent diverter 156 in the form of a plurality of louvers. In other embodiments, the vent diverter may be formed as a structure with an opening on one side that covers a plurality of apertures in the vent. Further still, in some embodiments, the vent diverter is formed as a duct that is coupled to the vent and can be positioned to guide the exhaust to a desired location away from the dryer box.

In another aspect, the disclosure provides a drying system for drying articles inside a kitchen drawer. The drying system includes a cabinet frame including an opening, a kitchen drawer disposed in the opening of the cabinet frame and movable between an extended position and closed retracted position, and a dryer box according to the disclosure disposed in the kitchen drawer.

Figure 7:
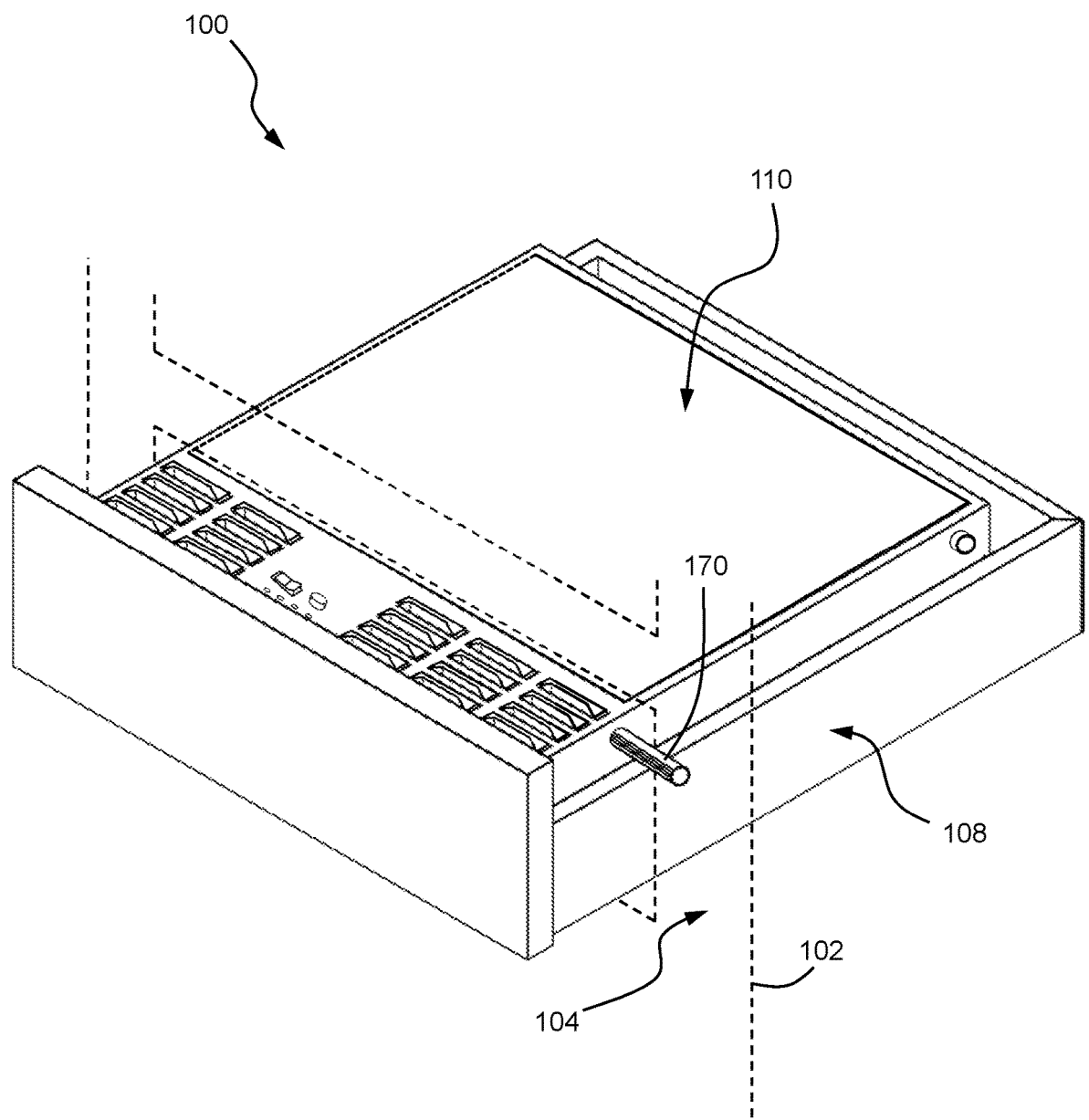
FIG. 7 is a schematic perspective view of a drying system according to an embodiment of the disclosure.

FIG. 7 illustrates such a drying system 100 including the dryer box 110 shown in FIGS. 1 and 2. Dryer box 110 is disposed in a drawer 108 of a cabinet 102. FIG. 7 shows the drying system 100 in use, with the drawer 108 open to a slightly extended position with the first actuator 170 engaging the front face 104 of the cabinet 102 to prevent the drawer 108 from retracting to a closed position.

Figure 8:
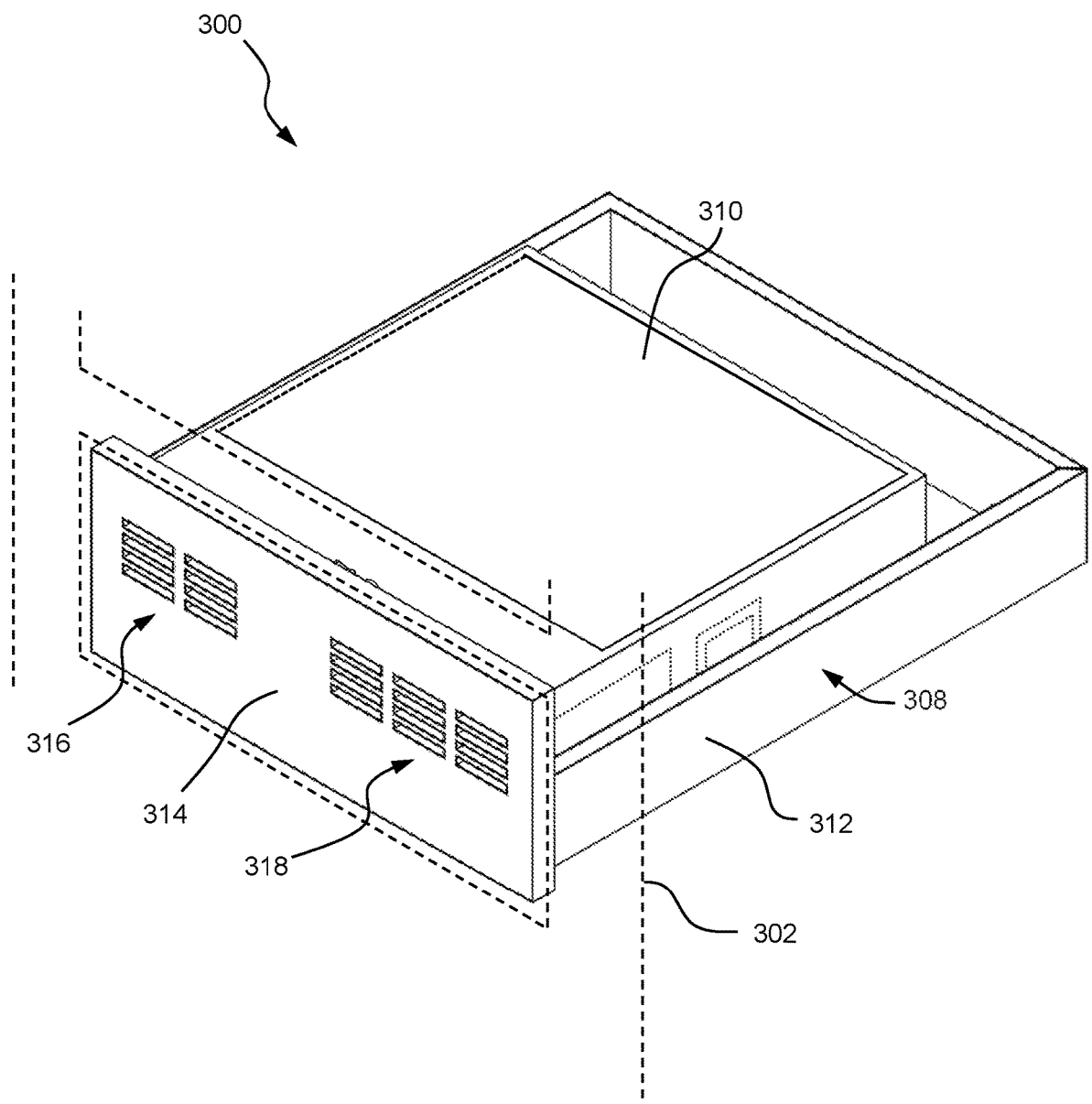
FIG. 8 is a schematic perspective view of a drying system according to another embodiment of the disclosure.

FIG. 8 illustrates another embodiment of a drying system 300 according to the disclosure. Drying system 300 includes the embodiment of dryer box 310 shown in FIG. 3. The drying system 300 includes a cabinet 302 that has a drawer 308 with a drawer box 312 and a drawer face 314. The drawer 308 is shown in a closed position but the drawer face 314 includes an opening with a first section 316 aligned with the inlet vent of the dryer box 310 (see FIG. 3) and a second section 318 aligned with the outlet vent of the dryer box (see FIG. 3). Accordingly, the ventilation fan of dryer box 310 can operate with the drawer in the closed position by drawing air through the first section 316 of the opening and exhausting air through the second section 318. As shown in FIG. 8, the opening in the drawer face 314 can be formed by a plurality of apertures that provide fluid communication through the drawer face. Further, while the opening in the drawer face 314 shown in the embodiment depicted in FIG. 8 includes two separate sections, in other embodiments, the sections of the opening can be adjacent or connected.

Figure 9:
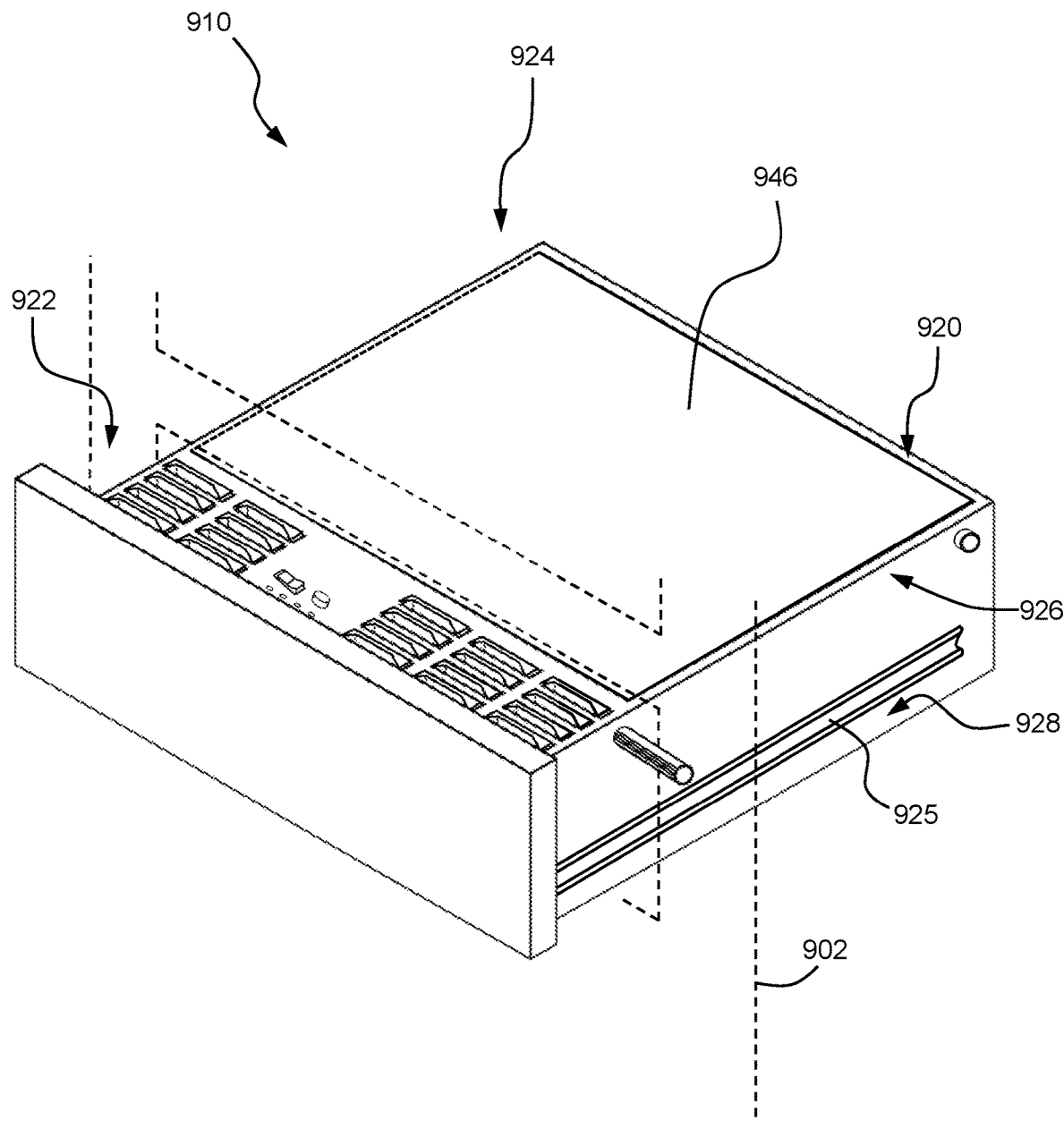
FIG. 9 is a schematic perspective view of a dryer box according to another embodiment of the disclosure.

While the embodiments shown in FIGS. 7 and 8 include the dryer box disposed inside of a structure that forms the cabinet drawer, in other embodiments, the dryer box itself may form the drawer. For example, in some embodiments, a drawer face may be disposed on the front of the dryer box and the dryer box may be independently movable into and out of a cabinet. For example, the dryer box may include a rail or be attached to drawer slides so that the dryer box can move into and out of the cabinet without a separate drawer structure. Such an embodiment is shown in FIG. 9. Dryer box 910 includes a housing 920 that has a front 922, a back 924, a top 926 and a bottom 928. The housing 920 includes a basin that defines an interior space for receiving items that can be closed by a lid 944. The dryer box 910 also includes an inlet vent 952 and an outlet vent 954 that are both disposed along the front 922 of the housing 920. In the embodiment shown in FIG. 9, the front 922 of housing 920 is configured as a drawer face. Further, housing 920 includes rails 925 so that dryer box 910 can slide into and out of cabinet 902.

While various aspects and embodiments have been disclosed herein, it will be apparent to those skilled in the art that various modifications and variations may be made to the devices and methods described here without departing from the scope of the disclosure. Accordingly, the present disclosure is intended to cover such modifications and variations of the disclosure, with the scope of the disclosure being set forth by the appended claims and their equivalents.

The invention claimed is:

1. A dryer box for a kitchen drawer, the dryer box comprising:
   a housing having a front, a back, a top and a bottom, the housing including:
     a basin defining an interior space configured to hold items for drying, and
     a lid configured to close the basin at the top of the housing;
   an inlet vent disposed along the front of the housing;
   an outlet vent disposed along the front of the housing;
   a ventilation fan in fluid communication with the inlet vent and the outlet vent, the ventilation fan being configured to circulate air through the interior space of the housing from the inlet vent to the outlet vent;

an actuator that is movable between a first position in which the actuator is configured to hold the kitchen drawer open and a second position in which the kitchen drawer is closed; and a controller configured to send a control signal to the actuator to move the actuator to the second position so as to initiate the closing of the drawer.

2. The dryer box according to claim 1, further comprising a user input disposed at the front of the housing.

3. The dryer box according to claim 2, wherein the user input is positioned between the inlet vent and the outlet vent.

4. The dryer box according to claim 1, wherein, when in the first position, the actuator extends laterally from a side of the housing and is configured to engage a cabinet frame that contains the kitchen drawer so as to hold the kitchen drawer in the open position.

5. The dryer box according to claim 4, further comprising a spring configured to attach to the cabinet frame and urge the kitchen drawer to a closed position, wherein the actuator is configured to counter the force of the spring when arranged in the first position.

6. The dryer box according to claim 1, wherein the controller further configured to send another control signal to the ventilation fan to operate the ventilation fan for a predetermined time period.

7. The dryer box according to claim 1, wherein the basin of the housing is water sealed, and wherein the housing includes a seal disposed between the basin and the lid.

8. The dryer box according to claim 1, wherein a rack is disposed in the interior space of the housing that is configured to hold items above a bottom surface of the basin.

9. The dryer box according to claim 1, further comprising a battery disposed in the housing and configured to provide power to the ventilation fan.

10. The dryer box according to claim 9, wherein the battery is removable from the housing.

11. The dryer box according to claim 1, further comprising a vent diverter disposed over the outlet vent and configured to direct exhaust from the dryer box.

12. A drying system for drying articles inside a kitchen drawer, the system comprising:

a cabinet frame including an opening;

a kitchen drawer disposed in the opening of the cabinet frame and movable between an extended position and closed retracted position; and a dryer box disposed in the kitchen drawer, the dryer box comprising:

a housing having a front, a back, a top and a bottom, the housing including:

a basin defining an interior space configured to hold items for drying, and a lid configured to close the basin at the top of the housing;

an inlet vent disposed along the front of the housing;

an outlet vent disposed along the front of the housing; and a ventilation fan in fluid communication with the inlet vent and the outlet vent, the ventilation fan being configured to circulate air through the interior space of the housing from the inlet vent to the outlet vent, an actuator that is movable between a first position in which the actuator is configured to hold the kitchen drawer in an open position and a second position in which the kitchen drawer is closed, and a controller configured to send a control signal to the actuator to move the actuator to the second position so as to initiate the closing of the drawer, wherein the inlet vent and the outlet vent are disposed on the top surface of the housing.

13. A drying system for drying articles inside a kitchen drawer, the system comprising:

a cabinet frame including an opening;

a kitchen drawer disposed in the opening of the cabinet frame and movable between an extended position and closed retracted position; and a dryer box disposed in the kitchen drawer, the dryer box comprising:

a housing having a front, a back, a top and a bottom, the housing including:

a basin defining an interior space configured to hold items for drying, and a lid configured to close the basin at the top of the housing;

an inlet vent disposed along the front of the housing;

an outlet vent disposed along the front of the housing; and a ventilation fan in fluid communication with the inlet vent and the outlet vent, the ventilation fan being configured to circulate air through the interior space of the housing from the inlet vent to the outlet vent, wherein the inlet vent and the outlet vent are disposed on a front face of the housing, wherein the drawer includes a drawer box and a drawer face disposed at the front of the drawer box, and wherein the drawer face includes an opening including a first section aligned with the inlet vent and a second section aligned with the outlet vent.

14. The dryer box according to claim 12, wherein, when in the first position, the actuator extends laterally from a side of the housing and is configured to engage the cabinet frame so as to hold the kitchen drawer in the open position.

15. The dryer box according to claim 14, further comprising a spring attached to the rear of the cabinet frame and configured to urge the kitchen drawer to a closed position, wherein the actuator is configured to counter the force of the spring when arranged in the first position.

16. A method of operating a dryer box for drying articles in a kitchen drawer, the method comprising:

providing the dryer box in the kitchen drawer, the dryer box comprising:

a housing having a front, a back, a top and a bottom, the housing including:

a basin defining an interior space configured to hold items for drying, and a lid configured to close the basin at the top of the housing, an inlet vent disposed along the front of the housing, an outlet vent disposed along the front of the housing;

a ventilation fan in fluid communication with the inlet vent and the outlet vent, the ventilation fan being configured to circulate air through the interior space of the housing from the inlet vent to the outlet vent;

an actuator that is movable between a first position in which the actuator holds the kitchen drawer in an open position and a second position in which the kitchen drawer is in a closed position; and a controller configured to send a control signal to the actuator;

operating the ventilation fan so as to remove moisture from the interior space of the housing of the dryer box; and sending the control signal from the controller to the actuator to move the actuator from the first position to the second position so as to move the kitchen drawer from the open position to the closed position.

17. The method according to claim 16, wherein moving the actuator to the second position disengages the actuator from a front face of the cabinet frame, such that a spring urges the kitchen drawer to the closed position.

18. The method according to claim 16, wherein after the actuator is moved to the second position, a spring urges the kitchen drawer to the closed position.

\* \* \* \* \*